Oct. 30, 1928.
T. MIDGLEY
1,689,793
METHOD OF APPLYING BREAKER STRIPS IN THE MANUFACTURE OF TIRE CASINGS
Filed July 26, 1926
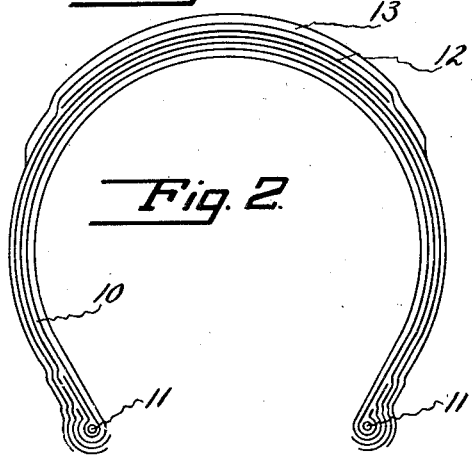
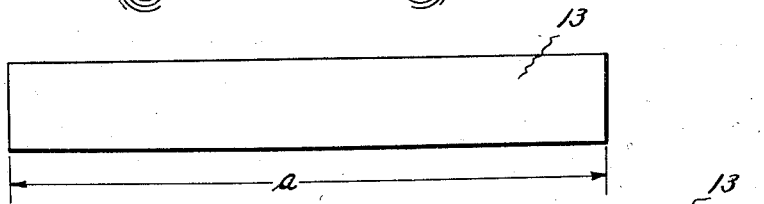
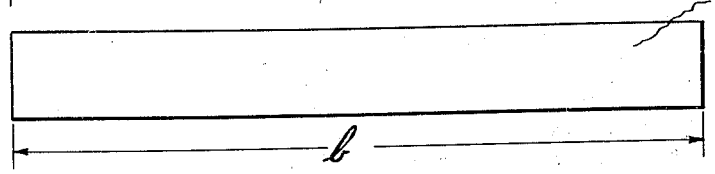
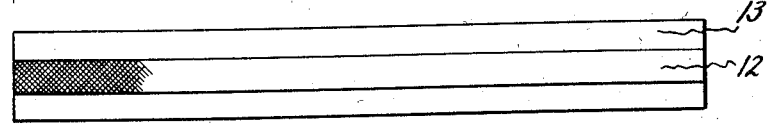
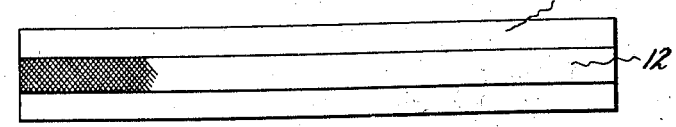
INVENTOR.
BY Thomas Midgley
Edward C. Taylor
ATTORNEY.

Patented Oct. 30, 1928.

1,689,793

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

METHOD OF APPLYING BREAKER STRIPS IN THE MANUFACTURE OF TIRE CASINGS.

Application filed July 26, 1926. Serial No. 124,940.

This invention relates to the application of breaker strips in the manufacture of tire casings, particularly such as are made in flat band form. Difficulty has previously been experienced in the making of tire casings of this type because of the rupture of the fabric forming the breaker strips when the tire casing is expanded from the flat into tire form. It is the object of this invention to apply the breaker strips in such a manner as will avoid any danger of rupture when the tire is expanded.

The invention will now be described in relation to the accompanying drawings, in which:

Fig. 1 is a diagrammatic sectional view of a tire casing as built in the flat before expansion;

Fig. 2 is a similar view showing the tire expanded;

Fig. 3 is a diagrammatic view of a piece of tread rubber;

Fig. 4 is a similar view showing the tread rubber stretched;

Fig. 5 is a view showing the rubber of Fig. 4 with a breaker strip applied; and

Fig. 6 is a similar view showing the condensation of the breaker strip due to the contraction of the tread.

In the manufacture of a tire casing, according to my invention in its preferred form, I form a tire carcass 10 in the flat in any preferred or desired manner. This flat band carcass is provided with bead edges 11 and is formed of suitable plies of material, which need not be discussed in detail. I then take a strip of tread rubber 13 of a length $a$, as shown in Fig. 3. The length $a$ is chosen so that it is substantially the same as the circumference of the outside of the flat band carcass. This strip of tread rubber is then stretched longitudinally until it reaches a length $b$ substantially equal to the circumference of the tire casing when expanded into tire form. To this stretched piece of tread rubber I add a strip of breaker fabric 12, preferably in an unstretched condition. It will be observed that the angle of the cords or threads forming the breaker strip is about 45° in this figure. The uncured rubber forming the tread strip 13 possesses great elasticity, and when stretched to the length $b$ it has a tendency to return to its original length. After the breaker strip 12 has been applied to the stretched tread band 13, the band is permitted to contract. The band upon contraction will resume substantially its original length and in so doing will condense the breaker strip longitudinally. It will be observed that in Fig. 6 the angle of the cords or threads of the breaker strip is less than 45°.

The tread strip 13 with the condensed strip of breaker fabric adhesively applied thereto is now secured to the outside of the flat carcass band as shown in Fig. 1. This band is now ready to be stretched into tire form as shown in Fig. 2. On account of the fact that the breaker strip has been condensed in order to get it to the length desired for application to the flat carcass band, it will not be subjected to any injurious strain when the tire band is expanded into the horse-shoe section shown in Fig. 2. The difficulty which occurred in prior methods is thus avoided.

Instead of first stretching the tread band, as described above, the tread band may, if of proper composition, be taken while hot from the calender and the breaker strip applied while in this condition. Hot calendered rubber shrinks greatly on cooling and this of itself may be sufficient to condense the breaker strip to the degree desired. Of course, instead of using the method suggested, the breaker strip can be condensed by other means and applied while thus condensed to a strip of tread rubber having the length $a$.

Having thus described my invention, I claim:

1. A method of making a tire casing which comprises forming the carcass portion thereof in flat band form, forming a strip of tread rubber of a length substantially equal to the circumference of the flat band carcass, stretching the strip of rubber to a length substantially equal to the circumference of the tire when expanded to tire form, adhesively securing to the stretched strip of rubber a length of breaker fabric in unstretched condition, permitting the strip of tread rubber to contract to substantially its original length, adhesively securing the combined tread and breaker strips to the flat band carcass, and expanding the carcass into tire form.

2. A method of making a tire casing which comprises forming the carcass portion thereof in flat band form, forming a strip of tread rubber of a length substantially equal to the circumference of the tire when expanded to tire form, applying to the strip of tread rubber a length of breaker fabric in unstretched condition, contracting the strip of tread rubber until it is of a length substantially equal to the circumference of the flat band, applying the combined tread and breaker strips to the flat band carcass, and expanding the tire carcass to tire form.

3. A method of making a tire casing which comprises forming the carcass portion in flat band form, adhesively securing to the flat band a laminated strip comprising a strip of tread rubber and a strip of longitudinally condensed breaker fabric, and expanding the tire carcass to tire form.

THOMAS MIDGLEY.